(12) United States Patent
Eggels

(10) Patent No.: US 12,516,817 B2
(45) Date of Patent: Jan. 6, 2026

(54) NOZZLE ASSEMBLY HAVING SWIRL-FREE AIR AND HYDROGEN INFLOW

(71) Applicant: Rolls-Royce Deutschland Ltd & Co KG, Blankenfelde-Mahlow (DE)

(72) Inventor: Ruud Eggels, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/845,796

(22) PCT Filed: Mar. 21, 2023

(86) PCT No.: PCT/EP2023/057211
§ 371 (c)(1),
(2) Date: Sep. 10, 2024

(87) PCT Pub. No.: WO2023/180318
PCT Pub. Date: Sep. 28, 2023

(65) Prior Publication Data
US 2025/0198624 A1   Jun. 19, 2025

(30) Foreign Application Priority Data
Mar. 24, 2022 (DE) .................. 10 2022 202 935.6

(51) Int. Cl.
*F23R 3/28* (2006.01)
*F23D 14/08* (2006.01)
(Continued)

(52) U.S. Cl.
CPC .............. *F23R 3/286* (2013.01); *F23D 14/08* (2013.01); *F23D 14/10* (2013.01); *F23D 14/105* (2013.01);
(Continued)

(58) Field of Classification Search
CPC ...... F23R 3/04; F23R 3/10; F23R 3/26; F23R 3/28; F23R 3/286; F23R 2900/00002;
(Continued)

(56) References Cited

U.S. PATENT DOCUMENTS 4,078,377 A * 3/1978 Owens .................. F02C 3/14
60/39.23
4,327,547 A   5/1982 Hughes
(Continued)

FOREIGN PATENT DOCUMENTS

DE   102021110616 A1   10/2022
GB      2175992 A      12/1986

OTHER PUBLICATIONS

German Search Report dated Jan. 16, 2023 from counterpart German App No. 10 2022 202 935.6.

*Primary Examiner* — Kyle Robert Thomas
(74) *Attorney, Agent, or Firm* — SHUTTLEWORTH & INGERSOLL, PLC; Timothy J. Klima

(57) ABSTRACT

The proposed solution relates to a nozzle assembly for a combustor of an engine, having at least one nozzle for injecting hydrogen into a combustion chamber of the combustor, wherein the nozzle has a nozzle main body which extends along a nozzle longitudinal axis and a nozzle head at one end of the nozzle main body and comprises a first air conduit, a fuel duct for the hydrogen to be injected, and a second air conduit. The fuel duct is arranged with a fuel exit opening for the hydrogen to be injected into the combustion chamber between the first and second air conduits with their first and second air exit openings, in relation to a radial direction running perpendicularly to the nozzle longitudinal axis. Also according to the invention, at least the second air conduit, which is situated radially further outwards, is designed and provided to provide an non-swirled air flow (Continued)

into the combustion chamber and the fuel duct is designed and provided to provide a non-swirled flow of hydrogen into the combustion chamber.

26 Claims, 11 Drawing Sheets

(51) Int. Cl.
*F23D 14/10* (2006.01)
*F23R 3/04* (2006.01)
*F23R 3/10* (2006.01)
*F23R 3/26* (2006.01)

(52) U.S. Cl.
CPC .................. *F23R 3/04* (2013.01); *F23R 3/10* (2013.01); *F23R 3/26* (2013.01); *F23R 3/28* (2013.01); *F23R 2900/00002* (2013.01)

(58) Field of Classification Search
CPC ........ F23D 14/08; F23D 14/10; F23D 14/105; F23D 14/20; F23D 14/22; F23D 14/48
See application file for complete search history.

(56) References Cited

U.S. PATENT DOCUMENTS

| | | | |
|---|---|---|---|
| 4,337,618 A | 7/1982 | Hughes | |
| 5,121,608 A | 6/1992 | Willis | |
| 6,434,945 B1 | 8/2002 | Mandai | |
| 7,117,679 B2 * | 10/2006 | Toon | F23R 3/30 |
| | | | 60/742 |
| 7,966,820 B2 * | 6/2011 | Romoser | F23R 3/343 |
| | | | 239/428 |
| 9,835,334 B2 * | 12/2017 | Ryon | F23D 11/107 |
| 11,639,795 B2 * | 5/2023 | Swaby | F23R 3/286 |
| | | | 60/740 |
| 2010/0050644 A1 | 3/2010 | Pidcock | |
| 2010/0212322 A1 | 8/2010 | York | |
| 2013/0019584 A1 | 1/2013 | Koizumi | |
| 2014/0013763 A1 | 1/2014 | Cohen | |
| 2015/0253011 A1 | 9/2015 | Uhm | |
| 2021/0199298 A1 * | 7/2021 | Berry | F23R 3/36 |

* cited by examiner

NOZZLE ASSEMBLY HAVING SWIRL-FREE AIR AND HYDROGEN INFLOW

This application is the National Phase of International Application PCT/EP2023/057211 filed Mar. 21, 2023 which designated the U.S.

This application claims priority to Italian Patent Application No. 102022202935.6 filed Mar. 24, 2022, which application is incorporated by reference herein.

The proposed solution concerns a nozzle assembly for a combustion chamber of an engine having at least one nozzle for injection of hydrogen into a combustion space of the combustion chamber.

Nozzle assemblies for engine combustion chambers are well known in a wide variety of embodiments. Hitherto conventional nozzles of such nozzle assemblies have focused on the injection of liquid fuels, such as kerosene or diesel, where mixing of the fuel with air takes place generally already within the nozzle, in order to thus generate a combustible fuel-air mixture directly downstream of an end of the nozzle. Typically, the air that is to be admixed here has swirl imparted to it already within the nozzle, such that a swirling fuel-air flow with a comparatively large degree of turbulence, which is considered to be advantageous, e.g., for combustion of kerosene, is created downstream of the nozzle end.

Recently, engine concepts are also increasingly being developed in which the engine is operated partially or entirely with hydrogen. However, if the intention is then to operate an engine with hydrogen instead of kerosene or diesel whilst maintaining the same design as far as possible, a different injection configuration for the hydrogen used, which is introduced in gaseous form into the combustion space and is also considerably more highly flammable, is necessary.

Against this background, the nozzle assembly as disclosed herein is proposed, which specifically comprises a nozzle for injecting hydrogen into a combustion space of an engine combustion chamber.

A proposed nozzle has a nozzle main body which extends along a nozzle longitudinal axis and a nozzle head at one end of the nozzle main body. The nozzle has at least one first air-guiding duct (e.g. in the nozzle main body or in the nozzle head) in order to guide a first air flow in the direction of the combustion space and to conduct same via at least one first air outlet opening of the first air-guiding duct into the combustion space. At least one fuel duct and at least one second air-guiding duct are provided on the nozzle head. The fuel duct is provided here for guiding hydrogen in the direction of the combustion space. Via the at least one second air-guiding duct, a second air flow can be guided in the direction of the combustion space and conducted via at least one second air outlet opening of the second air-guiding duct into the combustion space. In the case of a proposed nozzle, the fuel duct with a fuel outlet opening for the hydrogen to be injected into the combustion space is arranged between the first and second air-guiding ducts with their first and second air outlet openings, with respect to a radial direction running perpendicularly to the nozzle longitudinal axis. In addition, it is provided that at least the second air-guiding duct, which is situated radially further to the outside, is designed and provided for supplying an unswirled air flow to the combustion space and the fuel duct is designed and provided for supplying an unswirled flow of hydrogen into the combustion space.

The proposed solution is therefore based on the basic concept of introducing at least a radially outer air flow and also a hydrogen flow in a state as unswirled as possible into the combustion space in order to prevent coherent structures in the flow such that both the air flow from the radially outer second air-guiding duct and the hydrogen flow from the fuel duct are introduced into the combustion space at as great a flow velocity as possible in the axial direction (with respect to the nozzle longitudinal axis). In addition, a nozzle of a proposed nozzle assembly is designed to introduce hydrogen and air into the combustion space unmixed, i.e. without mixing within the nozzle. In combination with the high axial flow velocities of the hydrogen and the air which can be obtained via the proposed nozzle assembly, the effect is then achieved that a flammable fuel-air mixture arises only downstream of an end of the nozzle. This is advantageous in view of the highly flammable hydrogen, since it means that the combustion takes place further downstream from the nozzle end.

In particular, the nozzle of the proposed nozzle assembly can be designed and provided for rich quench lean combustion.

In one design variant, at least the second air-guiding duct which is situated radially further to the outside and the fuel duct run radially outward at their respective duct ends (having the second air outlet opening or the fuel outlet opening). Both the second air-guiding duct which is situated radially further to the outside and the fuel duct thus have a duct portion running radially to the outside at a nozzle end such that the air discharged therefrom and the hydrogen discharged therefrom have a flow component radially to the outside during operation of the engine.

In particular, in this context, it may be provided that the second air-guiding duct which is situated radially further to the outside comprises a duct portion which has the second air outlet opening and runs at an angle in the range of 30° to 60° with respect to the nozzle longitudinal axis, in particular at an angle in the range of 35° to 50°, with respect to the nozzle longitudinal axis. Alternatively or in addition, the fuel duct can comprise a duct portion which has the fuel outlet opening and runs at an angle in the range of 30° to 60°, in particular in the range of 35° to 50°, with respect to the nozzle longitudinal axis. If a respective duct portion of the air-guiding duct and/or of the fuel duct having the associated outlet opening runs radially to the outside at such a comparatively large (opening) angle with respect to the nozzle longitudinal axis, the creation of a recirculation zone downstream of the nozzle end can be supported. Combustion temperatures in a close vicinity downstream of the nozzle end can therefore be kept comparatively low, and nevertheless highly flammable hydrogen is injected into the combustion space.

In order to increase the flow velocities at which hydrogen and air are introduced from the fuel duct and from the second air-guiding duct which is situated radially further to the outside into the combustion space, and optionally to keep a boundary layer (in which the velocity is lower) thin, it can be provided in one design variant that the fuel duct and/or the second air-guiding duct which is situated radially further to the outside taper toward a respective duct end. This includes, for example, that the fuel duct and/or the second air-guiding duct have two duct portions which adjoin one another in the flow direction of the respective fluid (hydrogen or air) and of which a second duct portion having the respective outlet opening is formed tapering to the duct end. Such a second duct portion may also be formed with a profile facing radially to the outside.

In principle, the two duct portions adjoining one another in the flow direction of the respective fluid may also be formed with different profiles and/or flow cross sections. For example, a first duct portion may be formed with a rectilinear profile or a profile tapering along the nozzle longitudinal axis to the second duct portion. The second, optionally further tapering duct portion adjoins said first duct portion.

In one design variant, a central fuel feed line is provided in the nozzle main body for feeding hydrogen to the fuel duct. This is understood as meaning in particular that the central fuel feed line runs centrally along the nozzle longitudinal axis in the nozzle main body.

In order to guide hydrogen from a central fuel feed line into the fuel duct which is situated radially further to the outside, at least one corresponding fluid guide can be provided on the nozzle head. A part of such a fluid guide is then provided, for example, within a radially outwardly extending strut of the nozzle head, which strut runs through a portion of the first air-guiding duct. Via the fluid guide which is accommodated in a radially running strut or in a plurality of radially running struts, the hydrogen originating from the central fuel feed line is therefore guided radially to the outside and (in each case protected within the strut) through the first air-guiding duct, which is situated radially further to the inside, to the fuel duct via which the hydrogen is injected into the combustion space.

In principle, one or more struts which extend radially on the nozzle head may also be used for securing those portions of the nozzle head which form the first and second air-guiding ducts and the fuel duct to the nozzle main body.

In one design variant, a stabilization body is provided centrally at one end of the nozzle, said stabilization body comprising a substantially flat end face facing the combustion space. A substantially flat end face is therefore provided on the stabilization body, at which radially further to the outside on the edge air and hydrogen are introduced via the first and second air outlet openings and the fuel outlet openings. A central stabilization body with a substantially flat and in particular comparatively large end face supports the formation of a zone in a close vicinity downstream of the nozzle end, in which the axial velocity is comparatively low and, as a result, a stable recirculation zone is created which ensures that the flame is stable. Furthermore, a corresponding stabilization body can serve not only for stabilizing the flow and the flame within the combustion space, but can also simplify the possibility of achieving (pre-)evaporation of the hydrogen to be injected in gaseous form. Hydrogen can thus be (pre-) evaporated on the stabilization body itself.

For more compact integration of the stabilization body at the nozzle end, it can be provided that the stabilization body by way of an outer lateral surface defines at least a part of an inner wall of the first air-guiding duct which is situated radially on the inside. The first air-guiding duct, which is situated radially on the inside (and, in one development, therefore the air-guiding duct which is situated furthest radially to the inside), therefore guides air along the outer lateral surface of the stabilization body. In this connection, the stabilization body by way of its outer lateral surface can also define a radially outwardly facing inner wall portion for the first air-guiding duct such that the first air-guiding duct runs radially to the outside at its duct end. Analogously to the above-discussed possible profile of the second air-guiding duct and/or of the fuel duct, in a development which is based thereon, the first air-guiding duct can run at its duct end at an angle in the range of 30° to 60°, in particular of 35° to 50°, with respect to the nozzle longitudinal axis.

Alternatively or in addition, the first air-guiding duct, which is situated radially on the inside and extends at least in certain sections along a radially outer lateral surface of the stabilization body, can taper toward its duct end. Therefore, in one such design variant, a corresponding acceleration of the air flow out of the first air-guiding duct is (also) achieved. The acceleration of the flow out of the first air-guiding duct can also reduce the influence on the air flow of possible ridges which are present in the first air-guiding duct, and therefore the air flow is substantially uniform.

With regard to as large a recirculation zone as possible downstream of the nozzle end, the substantially flat end face of the nozzle-side stabilization body facing the combustion space can be formed comparatively extensively. For this purpose, it can be provided, for example, that said end face has an extent in a radial direction, with respect to the nozzle longitudinal axis, that corresponds to at least twenty times, in particular at least thirty times or forty times, a duct height of the first air-guiding duct at the first air outlet opening and/or a duct height of the second air-guiding duct at the second air outlet opening and/or a duct height of the fuel duct at the fuel outlet opening. Thus, for example, the ratio of a diameter of a circular end face of the stabilization body to a duct height of a respective duct referred to for the air which is to flow in or the hydrogen which is to be injected in can be at least 20:1, 30:1 or 40:1. This emphasizes the comparatively large extent of the end face of the stabilization body in relation to a cross-sectional area through which a flow passes and which is available at the respective outlet opening of a first or second air outlet duct and/or of a fuel duct.

In principle, a first or second air outlet duct and/or a fuel duct can be designed as an annular gap or annular segment gap at the nozzle end. In this way, the respective annular gap or annular segment gap extends circumferentially around the end face of the stabilization body (completely, in the case of an annular gap, or partially, in the case of an annular segment gap).

In one design variant, cooling is provided for the stabilization body. Such cooling can be achieved here, for example, via air or hydrogen. In the event of cooling via hydrogen, the hydrogen to be injected can be used for this purpose, and therefore the stabilization body serves for the (pre-)evaporation of the hydrogen to be injected, before the hydrogen is then injected into the combustion space. By this means, for example, it can be easier for the hydrogen to first of all be guided in liquid form to the nozzle head.

In principle, at least a part of the fluid guide, via which hydrogen is guided from a central fuel feed line in the nozzle main body into the fuel duct which is situated radially further to the outside, can be at least partially provided within the stabilization body. This includes in particular the fact that a part of the fluid guide which is provided within the stabilization body is then also provided for cooling the stabilization body.

In one possible development, this is achieved, for example, in that, for impact cooling of the stabilization body with hydrogen, hydrogen is guided via that part of the fluid guide which is provided within the stabilization body against a rear wall of the stabilization body that faces away from the combustion space. The rear wall which forms a rear side of the end face facing the combustion space can therefore be cooled via the hydrogen flowing onto the rear wall before the hydrogen is subsequently guided radially to the outside to the fuel duct. At least a part of the fluid guide for the hydrogen is therefore formed within the stabilization body in such a manner that, during operation of the engine, impact cooling for the stabilization body takes place via the hydrogen to be injected, before the hydrogen is conducted in the nozzle head radially to the outside to the fuel duct and via the latter without swirling into the combustion space.

In an alternative design variant which manages without a central fuel feed line and optionally without a centrally arranged stabilization body, a first air-guiding duct can be provided centrally on the nozzle main body running along the nozzle longitudinal axis. A fuel feed line for the fuel duct is then provided in the nozzle main body in a portion of the nozzle main body which is situated radially to the outside.

In such a design variant, the first central air-guiding duct can be formed widening, for example at its end having the first air outlet opening. With the radial widening, for example, a flow-guiding element extending radially to the outside is formed at the first air-guiding duct. Said flow-guiding element can run radially to the outside, for example at an angle in the range of 30° to 60° with respect to the nozzle longitudinal axis, in particular at an angle in the range of 35° to 50° with respect to the nozzle longitudinal axis. In particular in interaction with an unswirled air flow from the second air-guiding duct which is situated radially further to the outside and an unswirled flow of hydrogen from the fuel duct, optionally also directed radially to the outside, such a configuration of a nozzle can also be advantageous for the injection of hydrogen. In this case, in contrast to the second air-guiding duct and the fuel duct, swirling of the air in the first air-guiding duct may also be advantageous. For this purpose, for example at least one swirler is provided in the first air-guiding duct.

In one design variant with a central first air-guiding duct, a centrally arranged flow divider is provided in one possible development. Via said flow divider, an air flow in the first air-guiding duct is divided into an inner and an outer air-guiding duct part toward an end of the nozzle. In such a way, the flow divider permits two separate partial air flows radially on the inside with respect to the fuel outlet opening of the fuel duct. An outer air-guiding duct part can discharge a more greatly accelerated partial air flow in the direction of the fuel to be introduced. The central inner air-guiding duct part here provides a partial air flow which is slower in comparison and serves in particular for leaning of the resulting fuel-air mixture. The resulting fuel-air mixture is thus not immediately combustible in a near vicinity of the nozzle and thus prevents higher temperatures in the immediate vicinity of the nozzle end.

The flow divider can be designed, for example, with a central pipe portion with a cross-sectional area remaining the same along the nozzle longitudinal axis and a diffuser part which adjoins the pipe portion (downstream) toward the nozzle end, wherein the diffuser part has a cross-sectional area increasing along the nozzle longitudinal axis and consequently widens radially to the outside. In combination with a radially outwardly extending flow-guiding element of the first air-guiding duct, the outer air-guiding duct part can be bordered (radially on the outside) by the flow-guiding element and (radially on the inside) by the diffuser part. The outer air-guiding duct part can then also face radially to the outside. In particular, the outer air-guiding duct part can thereby also be designed as an annular gap in the region of the nozzle end.

At the nozzle end, that part of the air outlet opening which is defined by the inner air-guiding duct part can have a cross-sectional area (through which air flows) which is larger by at least a factor of 8, in particular by at least a factor of 10, than the cross-sectional area (through which air flows) of that part of the first air outlet opening which is defined by the outer air-guiding duct part. The central inner air-guiding duct part thus defines a cross-sectionally significantly larger part of the air outlet opening than the outer air-guiding duct part, which is separated from the inner air-guiding duct part via the diffuser part and is formed lying annularly radially to the outside.

In one design variant, a flow body around which the flow can flow axially can be provided in order to homogenize the partial air flow in the inner air-guiding duct part. For this purpose, the flow body is provided in the pipe portion of the flow divider. A design variant with a flow divider in the central first air-guiding duct thus specifically includes, for example, the fact that an unswirled air flow into the combustion space is (also) generated via the central first air-guiding duct. In one such design variant, a first central air-guiding duct is then consequently also formed free from a swirler. Accordingly, at a possible centrally arranged flow body in a pipe portion of a flow divider, no swirling means are provided.

In principle, the first and second air outlet openings and the fuel outlet opening can lie in a radial plane running perpendicularly to the nozzle longitudinal axis. In one such design variant, the individual outlet openings therefore do not have any axial offset with respect to one another. By contrast, however, a design variant is also conceivable in which the outlet openings are offset axially with respect to one another. In such a case, for example, the respective outlet opening is arranged axially further downstream the further it is located radially to the outside. An innermost, for example central, outlet opening or part thereof is therefore set back axially in relation to a radially outermost outlet opening and is therefore provided further upstream.

The proposed solution furthermore comprises an engine having at least one design variant of a proposed nozzle assembly.

The appended figures depict possible design variants of the proposed solution by way of example.

Figure 3A:
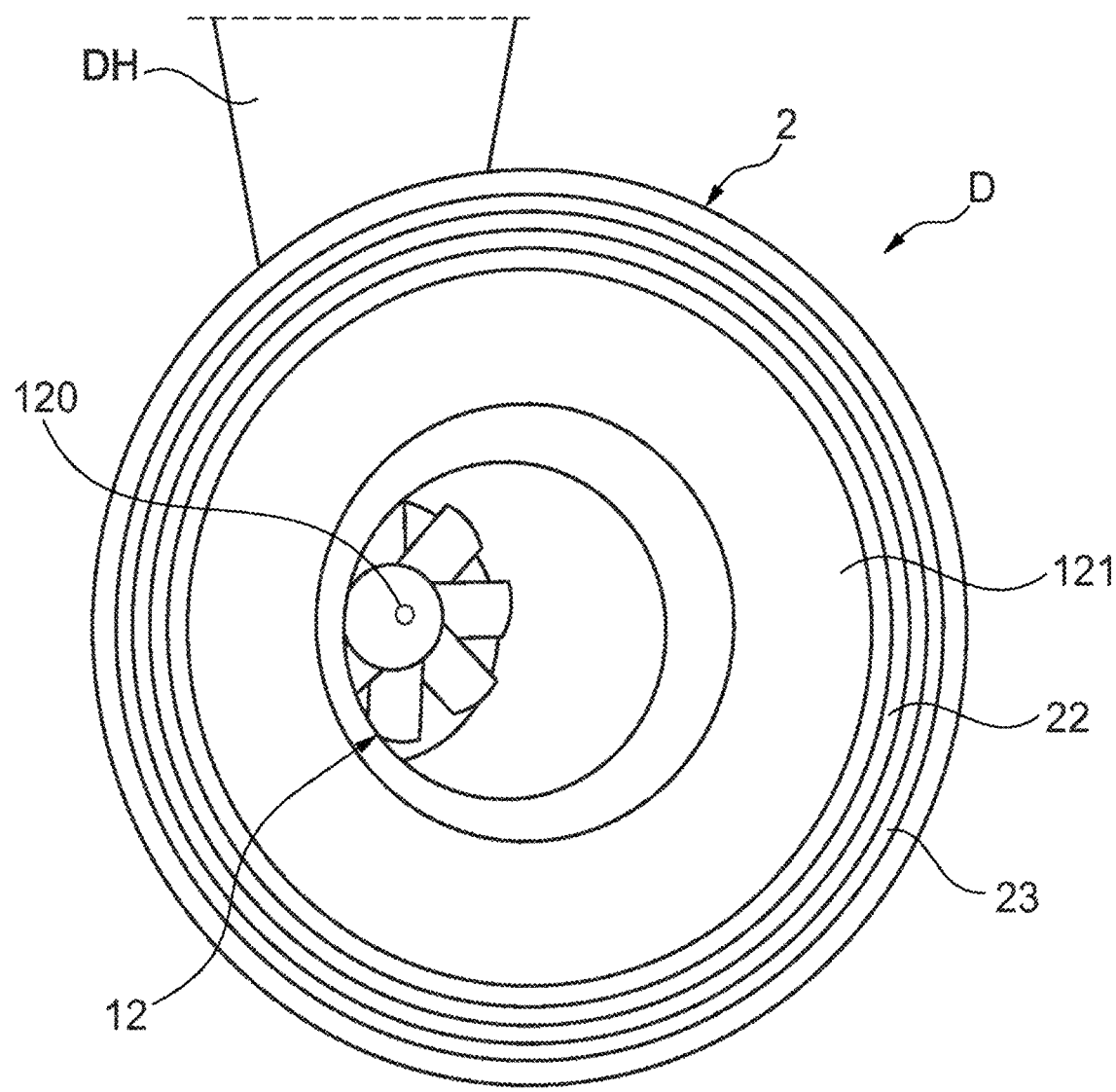
FIG. 3A shows a view of a nozzle of a further design variant of a proposed nozzle assembly looking at a nozzle end.
Figure 3B:
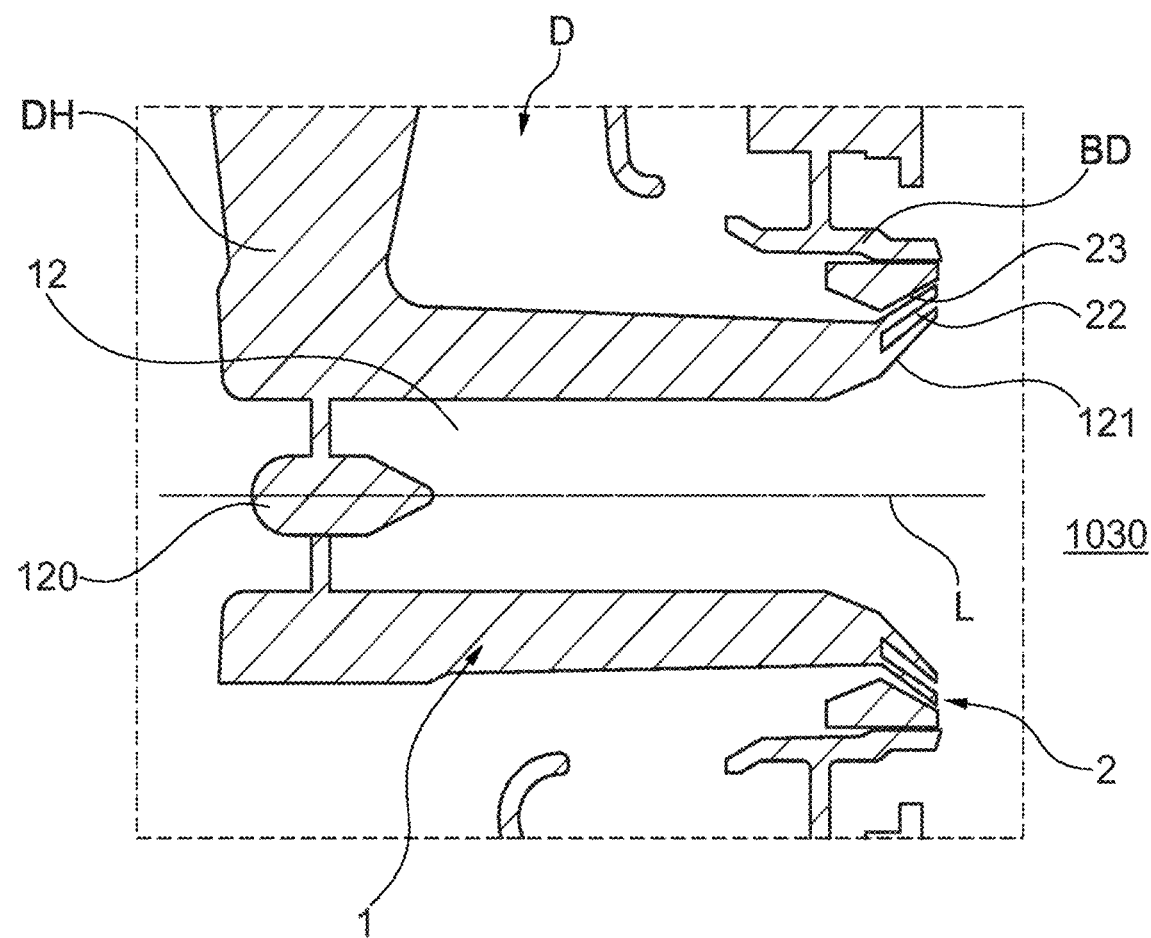
FIG. 3B shows a sectional illustration of the nozzle of FIG. 3A in an installed state.
Figure 4A:
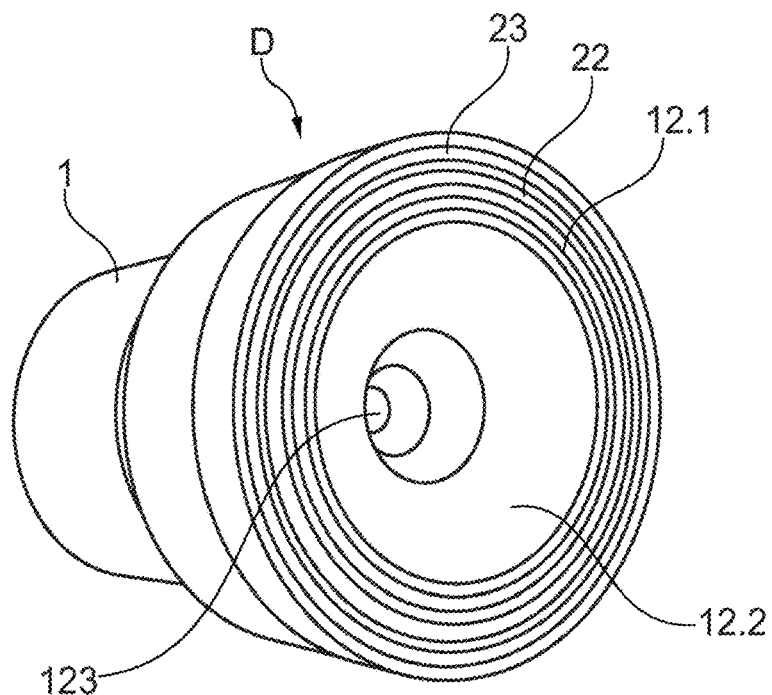
Figure 4B:
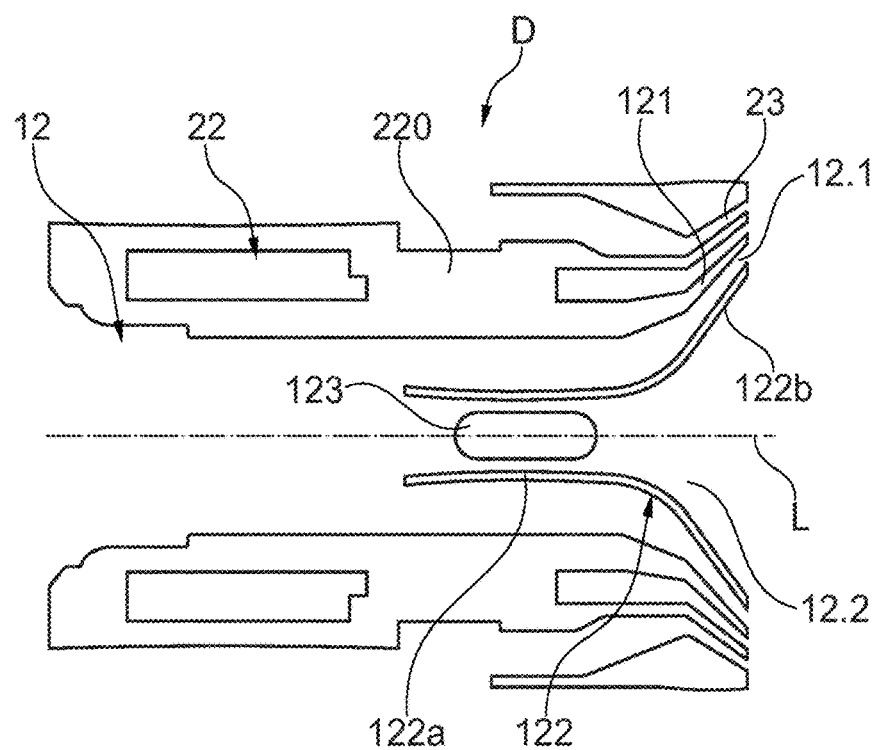
Figure 5A:
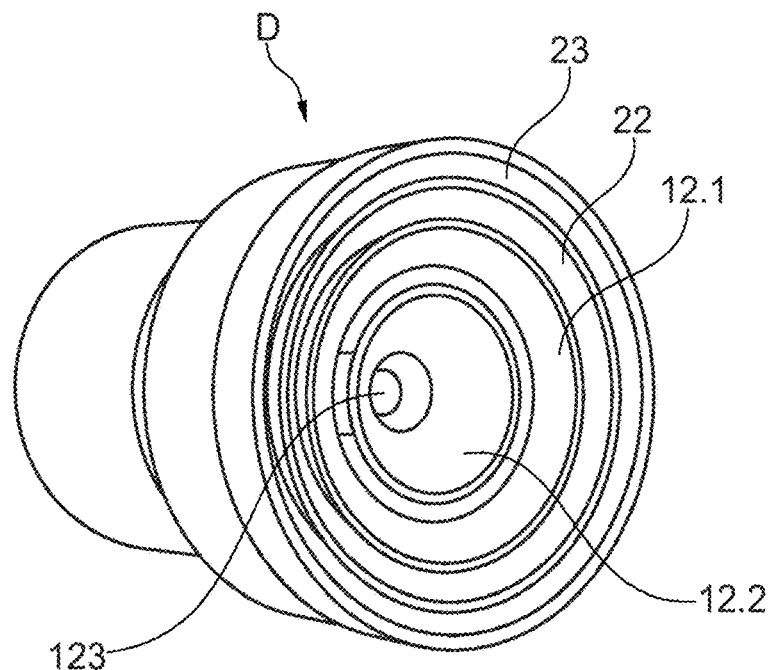
Figure 5B:
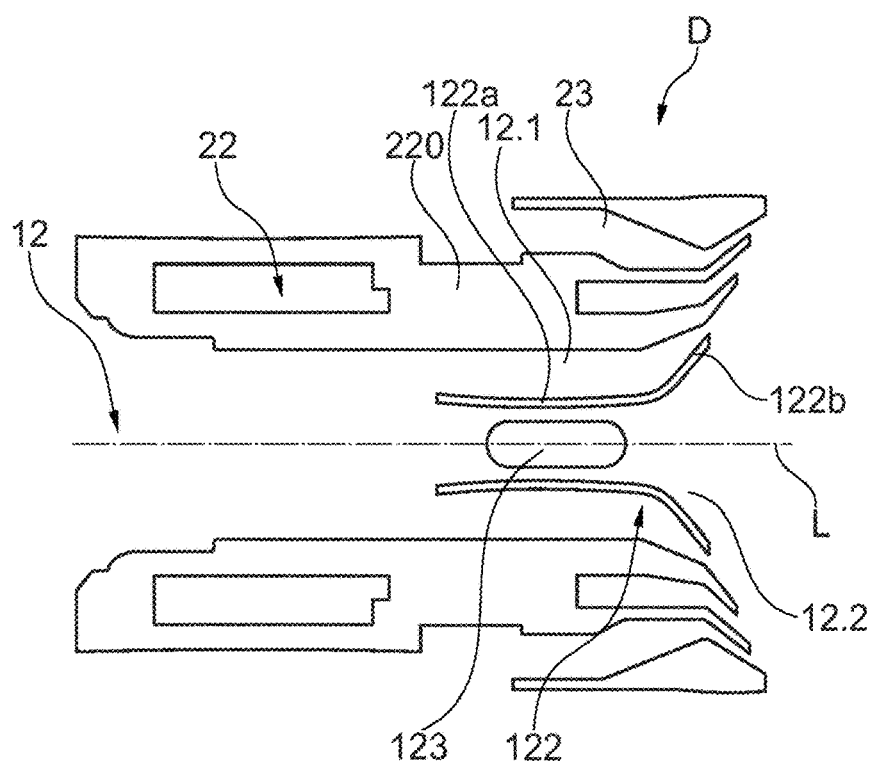
Figure 6A:
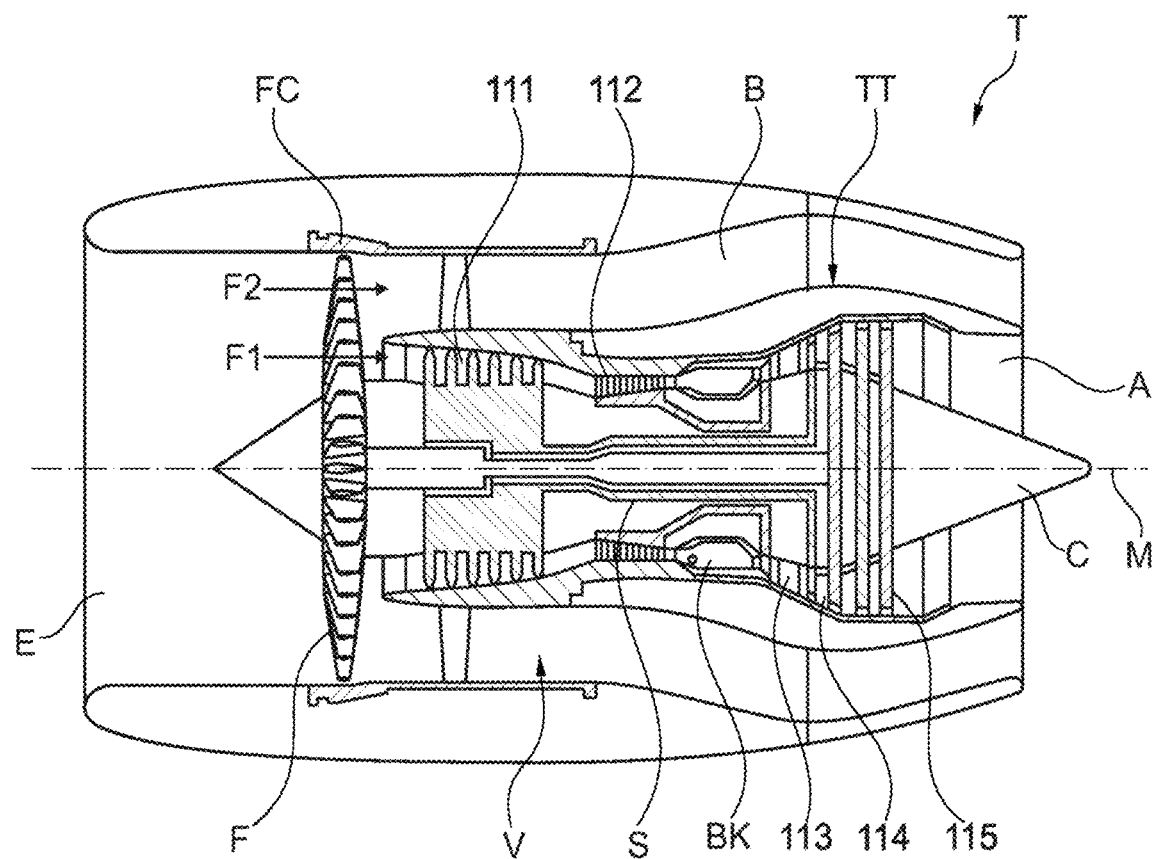
Figure 6B:
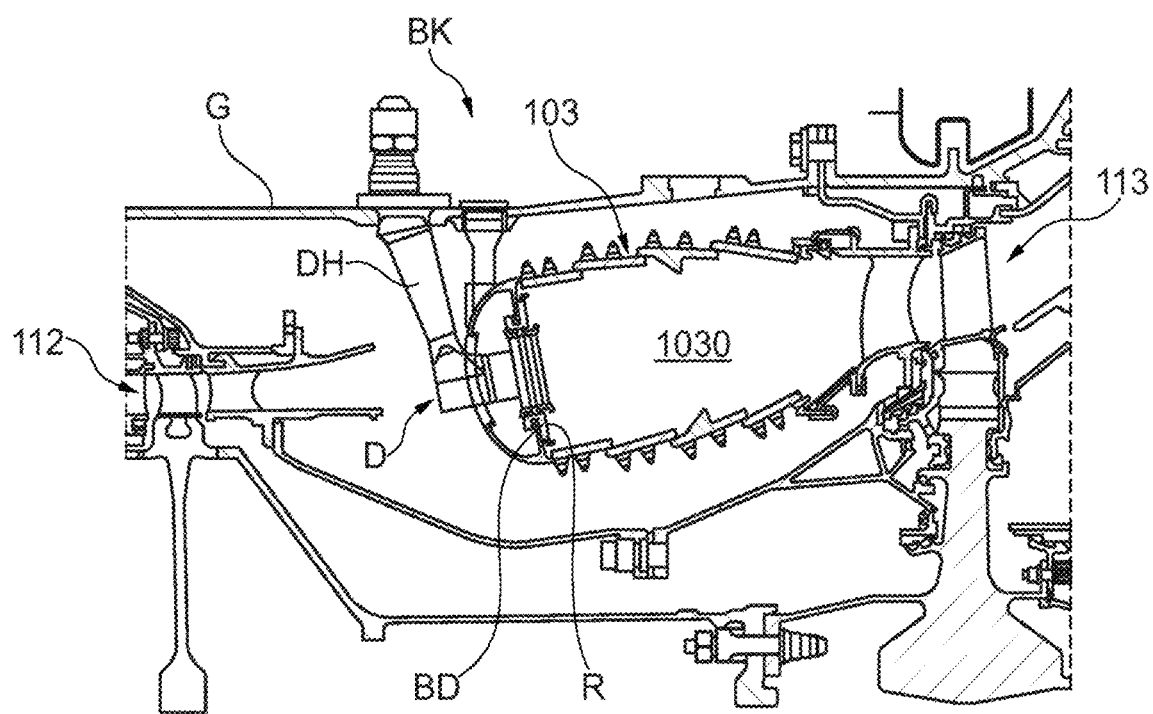

FIG. 4A shows, in a perspective illustration and in the form of a detail, a further design variant of a proposed nozzle assembly, in which-analogously to the design variant of FIGS. 3A and 3B-a central first air-guiding duct is provided via which, however, in contrast to the design variant of FIGS. 3A and 3B, an unswirled air flow into a combustion space is generated and a flow divider is integrated toward an end of the nozzle;

FIG. 4B shows a sectional illustration of the design variant of FIG. 4A;

FIGS. 5A-5B show, in views corresponding to FIGS. 4A and 4B, a development of the design variant of FIGS. 4A and 4B with outlet openings offset axially with respect to one another;

FIG. 6A shows an engine in which a design variant of a proposed nozzle assembly is used;

FIG. 6B shows, in the form of a detail and on an enlarged scale, the combustion chamber of the engine of FIG. 6A.

FIG. 6A shows, schematically and in a sectional illustration, a (turbofan) engine T in which the individual engine components are arranged one behind the other along an axis of rotation or central axis M, and the engine T is in the form of a turbofan engine. At an inlet or intake E of the engine T, air is drawn in along an inlet direction by means of a fan F. This fan F, which is arranged in a fan casing FC, is driven by means of a rotor shaft S which is set in rotation by a turbine TT of the engine T. The turbine TT here adjoins a compressor V, which has, for example, a low-pressure compressor 111 and a high-pressure compressor 112, and optionally also a medium-pressure compressor. On the one hand, the fan F conducts air in a primary air flow F1 to the compressor V, and, on the other hand, to generate thrust, in a secondary air flow F2 to a secondary flow duct or bypass duct B. The bypass duct B here runs around a core engine comprising the compressor V and the turbine TT and comprising a primary flow duct for the air supplied to the core engine by the fan F.

The air conveyed into the primary flow duct by means of the compressor V enters a combustion chamber assembly BK of the core engine, in which the drive energy for driving the turbine TT is generated. For this purpose, the turbine TT has a high-pressure turbine 113, an (optional) medium-pressure turbine 114 and a low-pressure turbine 115. Here, the energy released during the combustion is used by the turbine TT to drive the rotor shaft S and thus the fan F in order to generate the required thrust by means of the air conveyed into the bypass duct B. Both the air from the bypass duct B and the exhaust gases from the primary flow duct of the core engine flow out via an outlet A at the end of the engine T. Here, the outlet A commonly has a thrust nozzle with a centrally arranged exit cone C.

FIG. 6B shows a longitudinal section through the combustion chamber assembly BK of the engine T. This shows in particular an (annular) combustion chamber 103 of the engine T. A nozzle assembly is provided for the injection of fuel or an air-fuel mixture into a combustion space 1030 of the combustion chamber 103. Said nozzle assembly comprises a combustion chamber ring R on which a plurality of nozzles D are arranged at a combustion chamber head of the combustion chamber along a circular line around the central axis M. One or more combustor seals BD with mounting openings at which nozzle heads of the respective nozzles D are held are provided on the combustion chamber ring R, with the result that fuel can thereby be injected into the combustion chamber 103. Each nozzle D comprises a flange by way of which a nozzle bracket DH of the nozzle D is screwed to an outer casing G of the combustion chamber 103.

In order to be able to effectively inject hydrogen as fuel into the combustion space 1030 of the combustion chamber 103 via the nozzle D, the design variants of FIGS. 1A to 3B of a proposed nozzle assembly in each case make provision for the nozzle D at a nozzle head 2 to have a fuel duct 22 for the hydrogen, the fuel outlet opening of which lies in a radial direction, with respect to a nozzle longitudinal axis L of the nozzle D, between two air outlet openings 12 and 23 or 21 and 23. Via the air-guiding ducts 12/21, 21/23, air from a first air-guiding duct 12 or 21 which is situated radially to the inside and air from a second air-guiding duct 23 which is situated radially to the outside can in each case flow into the combustion space 1030. In order in this case to inject the hydrogen and at least the air from the second air-guiding duct 23, which is situated radially to the outside, at a comparatively high flow velocity and low degree of turbulence, at least the second air-guiding duct 23, which is situated radially further to the outside, is designed and provided for supplying an unswirled air flow to the combustion space 1030 and the fuel duct 22 is designed and provided for supplying an unswirled flow of hydrogen to the combustion space 1030.

Whereas, in the design variants of FIGS. 1A to 1C and 2A to 2B, a first air-guiding duct 21 is provided which is situated radially to the inside, is formed on the nozzle head 2 and guided along an outer lateral surface of a centrally arranged stabilization body 10 of the nozzle D, in order also to generate an air flow, which is as free from swirling as possible, into the combustion space 1030 via the first air-guiding duct 21, the design variant of FIGS. 3A to 3B provides a nozzle D, in which the first air-guiding duct 12 is formed running centrally along the nozzle longitudinal axis 11 and a swirled air flow is made available with the aid of a swirler 120.

Figure 1A:
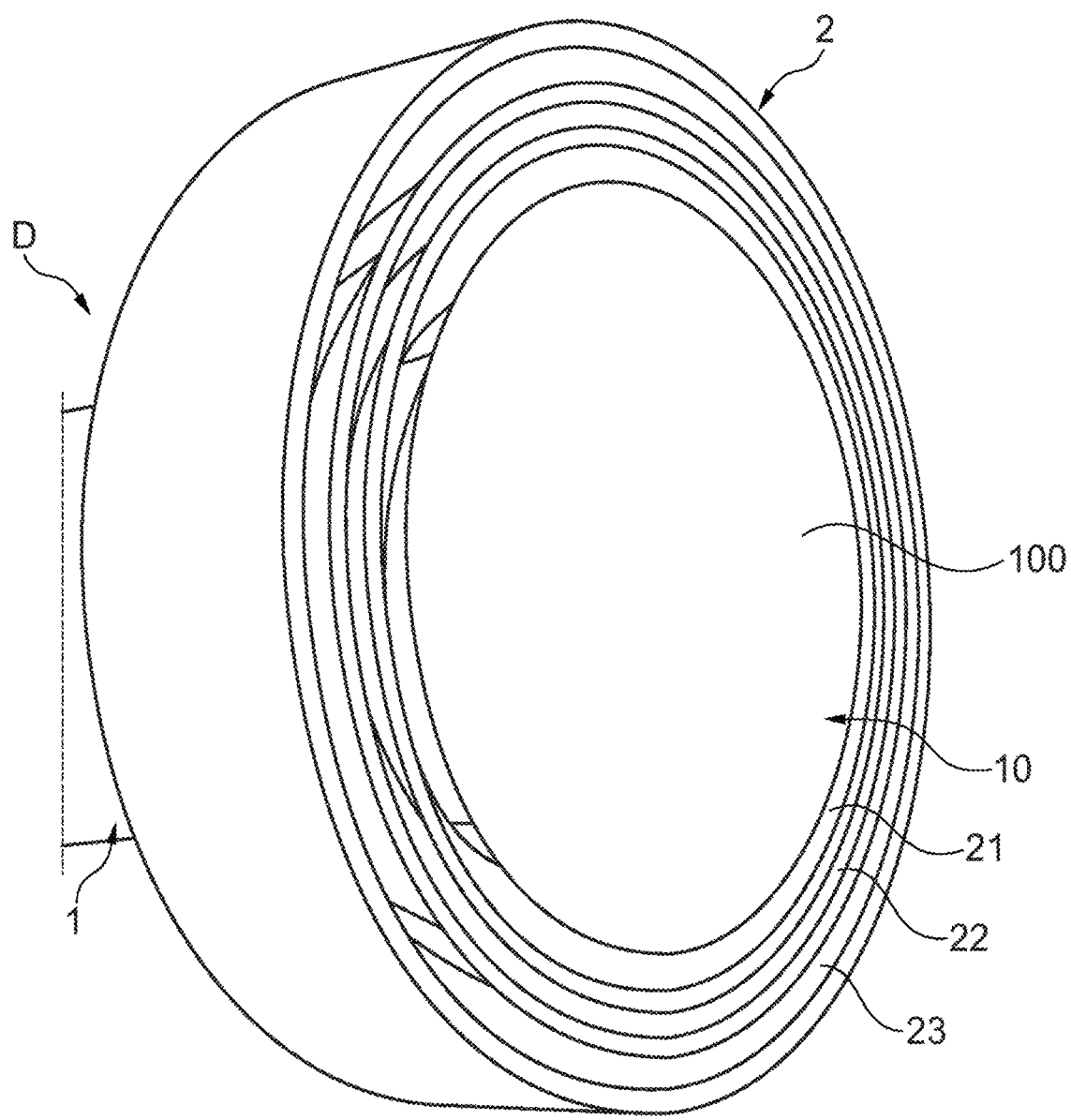
FIG. 1A shows, in the form of a detail, the end of a nozzle of a first design variant of a proposed nozzle assembly.
Figure 1B:
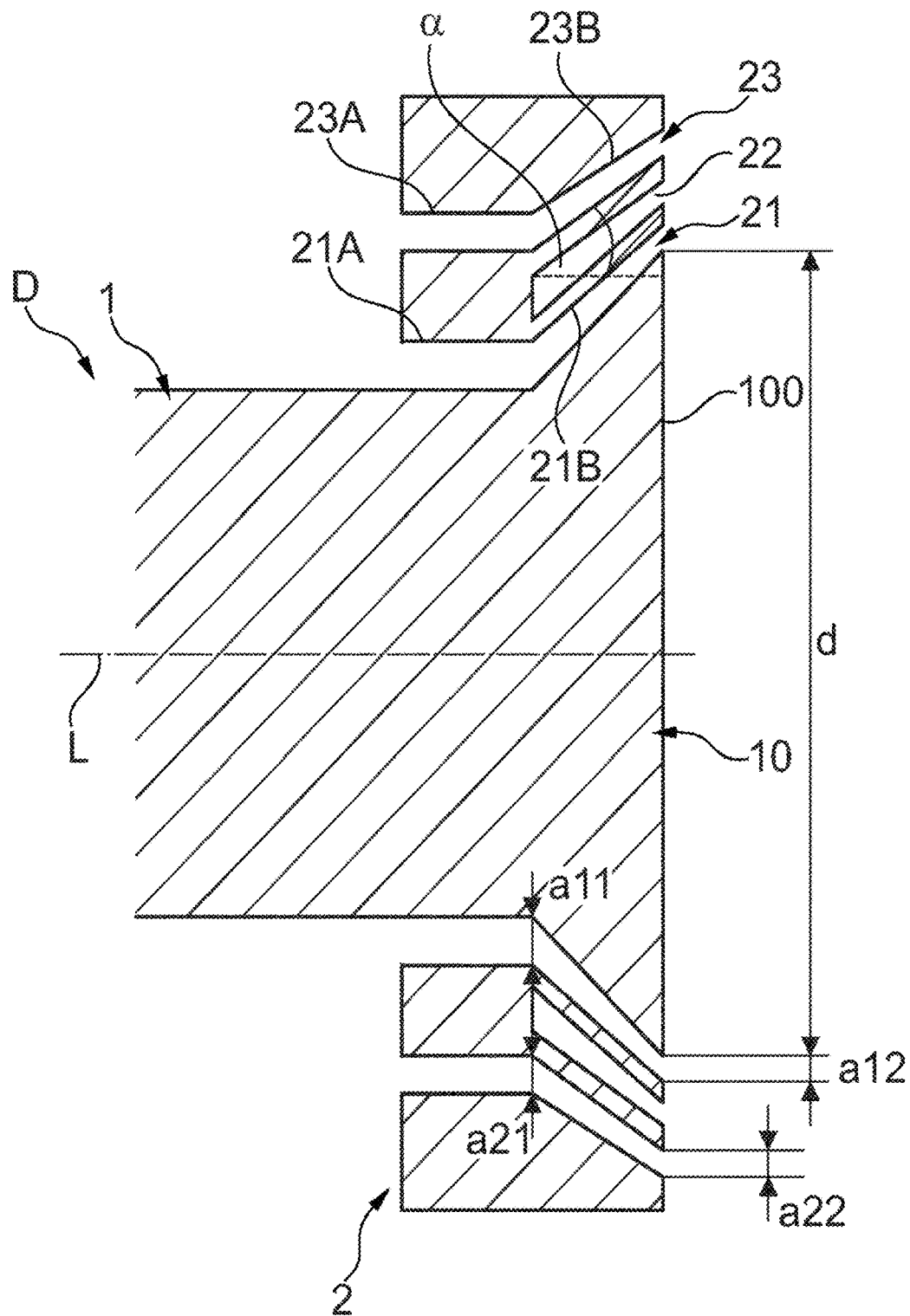
FIG. 1B shows a sectional illustration of the nozzle of FIG. 1A.
Figure 1C:
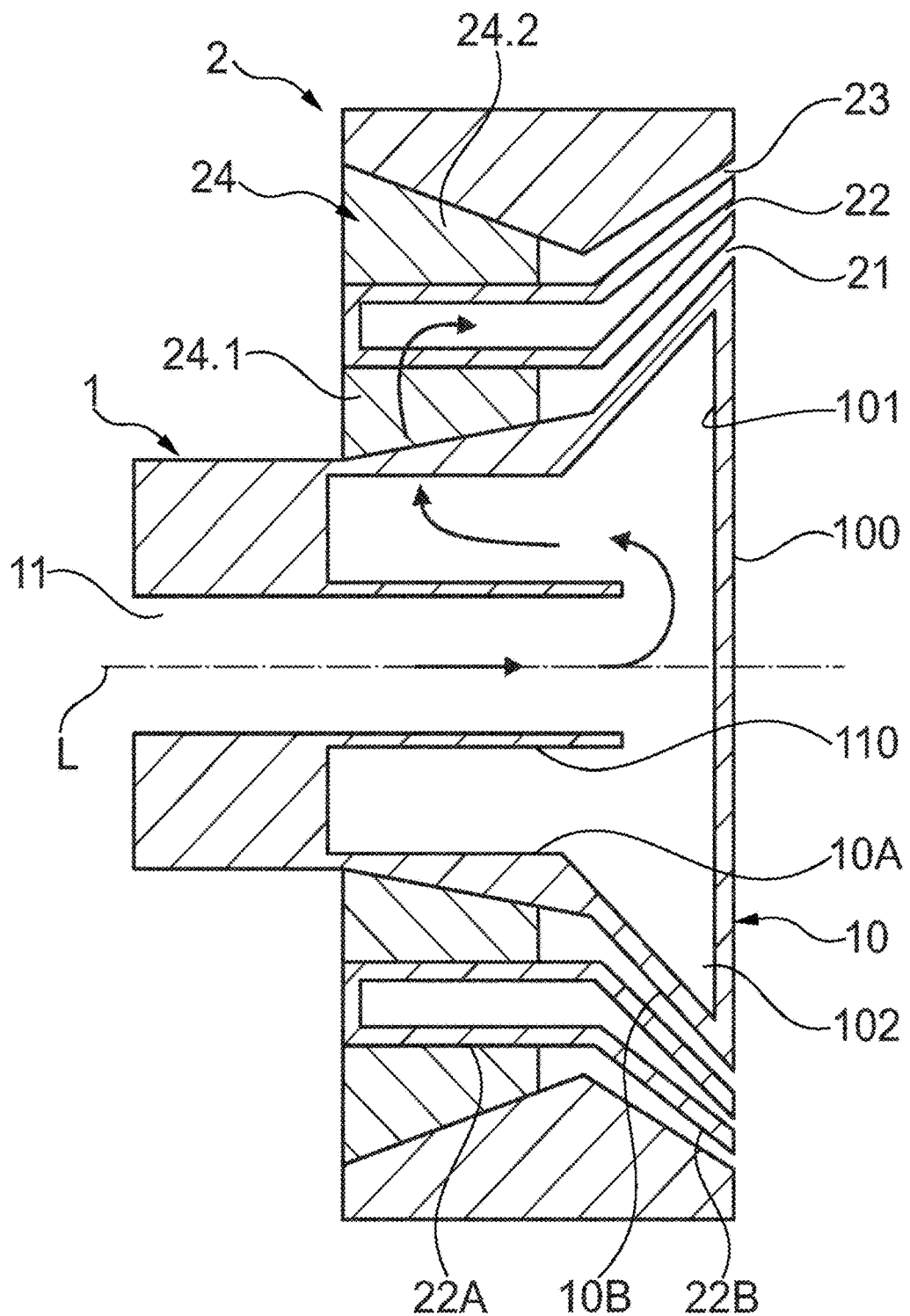
FIG. 1C shows a further sectional illustration of a development of the nozzle of FIGS. 1A and 1B showing impact cooling for a central stabilization body and a fluid guide for hydrogen to a fuel duct which is situated radially to the outside.

As is shown in the combination of FIGS. 1A, 1B and 1C, a design variant illustrated here of a proposed nozzle assembly provides a nozzle D, in which hydrogen can be guided via a central fuel feed line 11 extending along the nozzle longitudinal axis L in a nozzle main body 1 in the direction of a nozzle-end-side nozzle head 2. According to the sectional illustration of FIG. 1C, this central fuel feed line 11 leads into a cavity 102 of a stabilization body 10. The cavity 102 here is part of a fluid guide for the hydrogen which is to be injected and which is conducted from the cavity 102 via fluid lines in radially running struts 24 radially to the outside to a cross-sectionally annular fuel duct 22.

The stabilization body 10 has a substantially flat end face 100 which is illustrated in a frontal view in FIG. 1A and faces the combustion space 1030. This end face 100 is circular here and takes up a large portion of the cross-sectional area of the nozzle head 2. Via the first and second air-guiding ducts 21 and 23, which are in each case designed as an annular gap, and the fuel duct 22, which lies in between and is likewise designed as an annular gap, hydrogen and air are therefore injected unmixed into the combustion space 1030 comparatively radially far away from the nozzle longitudinal axis L. A stable flame is therefore created downstream of the nozzle end and in particular not in an immediate vicinity downstream of the nozzle D. This is advantageous specifically with regard to the comparatively highly flammable hydrogen in order to keep combustion temperatures in the close vicinity downstream of the nozzle D lower.

Furthermore, the stabilization body 10 can be used by the hydrogen guided therein for (pre-)evaporation of the hydrogen to be injected. The hydrogen guided for (pre-)evaporation at the stabilization body 10 can serve here simultaneously for cooling the stabilization body 10 and in particular its end face 10 facing the combustion space.

Thus, in the design variant illustrated, the hydrogen flows via the central fuel feed line 11 against a rear wall 101 of the stabilization body 10 that faces away from the combustion space 1030 and faces the cavity 102. The rear wall 101 and therefore the stabilization body 10 are therefore impact-cooled via the hydrogen flowing into the cavity 101. Subsequently, the hydrogen is deflected between a tubular end piece 110 of the central fuel feed line 11 and the inner walls of the stabilization-body-side cavity 102 and guided to the outside in a radial direction. Here, the hydrogen passes via one or more fluid lines in struts 24, which are distributed circumferentially, to the fuel duct 23. Each strut 24 can comprise one or more fluid lines.

In the illustrated design variant, each strut 24 has a first strut part 24.1 which extends in a radial direction through the first air-guiding duct 21, which is partially bordered radially on the inside by an outer lateral surface of the stabilization body 10. A second strut part 24.2, which is situated radially further to the outside, of the strut 24, in which strut part no flow line for the hydrogen is provided, extends through the second air-guiding duct 23 in a radial direction. The struts 24 distributed circumferentially therefore hold the nozzle-head-side air-guiding ducts 21, 23 and the fuel duct 22 on the stabilization body 10 and therefore on the nozzle main body 1.

As is apparent in particular from the sectional illustration of FIG. 1B, both the first and second air-guiding ducts 21 and 23 and the fuel duct 22 toward the nozzle end each have a duct portion with the respective air outlet opening or fuel outlet opening, which duct portion runs at an angle α with respect to the nozzle longitudinal axis L, which angle is in the range of 35° to 50°. The air flows from the air-guiding ducts 21 and 23 and the flow of hydrogen from the fuel duct 22 are therefore directed comparatively strongly radially to the outside, as a result of which the formation of a recirculation zone as far as possible further downstream from the nozzle end is supported.

Furthermore, the first and second air-guiding ducts 21 and 23 here are formed by way of example with two duct portions 21A, 21B or 23A, 23B which follow one another in the flow direction of the air along the nozzle longitudinal axis L. A first duct portion 21A and 23A runs here in each case substantially parallel and rectilinearly to the nozzle longitudinal axis L. The (second) duct portion 21B and 23B in each case adjoining the first duct portion then not only runs radially to the outside at the angle α, but also tapers toward the respective air outlet opening.

According to the sectional illustration of FIG. 1B, the second duct portion 21B of the first air-guiding duct 21 tapers, for example, from a gap width or duct height a11 to a gap width or duct height a12 at the associated first air outlet opening. The second duct portion 23B of the second air-guiding duct 23 tapers in turn to virtually the same extent from a duct height a21 to a duct height a22 at its second air outlet opening. The ratios a11:a12 and a21:a22 of the duct heights (and thus correspondingly the ratios of the cross-sectional area through which the flow passes at the inlet and outlet) lie here in the range of 1.5:1 to 3:1, in particular in the range of 1.7:1 to 2.3:1. The duct height a12 or a22 at the respective air outlet opening is thus smaller at least by a factor of 1.5 or even by a factor of 3 than the duct height a11 or a21 at the inlet of the air into the second duct portion 21B or 23B. Consequently, the cross-sectional area through which the flow passes is then also reduced from the inlet to the outlet of the respective second duct portion 21B or 23B by a factor in the range of 1.5 to 3.

By this means, the respective air flow is accelerated until it flows into the combustion space 1030 without a swirler and thus swirling of the air being provided within the respective air-guiding duct 21, 23. The air is therefore, via the two air-guiding ducts 21 and 23 tapering to the respective duct end, introduced in each case not swirled and at a comparatively high axial flow velocity into the combustion space 1030. The same applies to the hydrogen injected via the fuel duct 22 situated in between.

The illustrations of FIGS. 1B and 1C furthermore show the proportionally comparatively large end face 100 of the stabilization body 10. A diameter d of the circular end face 100 here thus corresponds at least to 20 times or even at least 30 or 40 times a duct height a12 or a22 of the first or second air-guiding duct 21 or 23. The duct heights a12 and a22 of the air-guiding ducts 21 and 23 at the air outlet openings are of the same order of magnitude as a duct height of the fuel duct 22 at its fuel outlet opening (in principle, the duct heights a12 and a22 may be substantially identical to each other or differ from each other by a ratio of up to 1:3).

From the sectional view of FIG. 1C, another possible development is apparent, in which a tapering can also be provided in a first duct portion 21A or 23A of the first or second air-guiding duct 21, 23, specifically here toward the respective second duct portion 21B or 23B. The air flow is then already accelerated in this case.

Figure 2A:
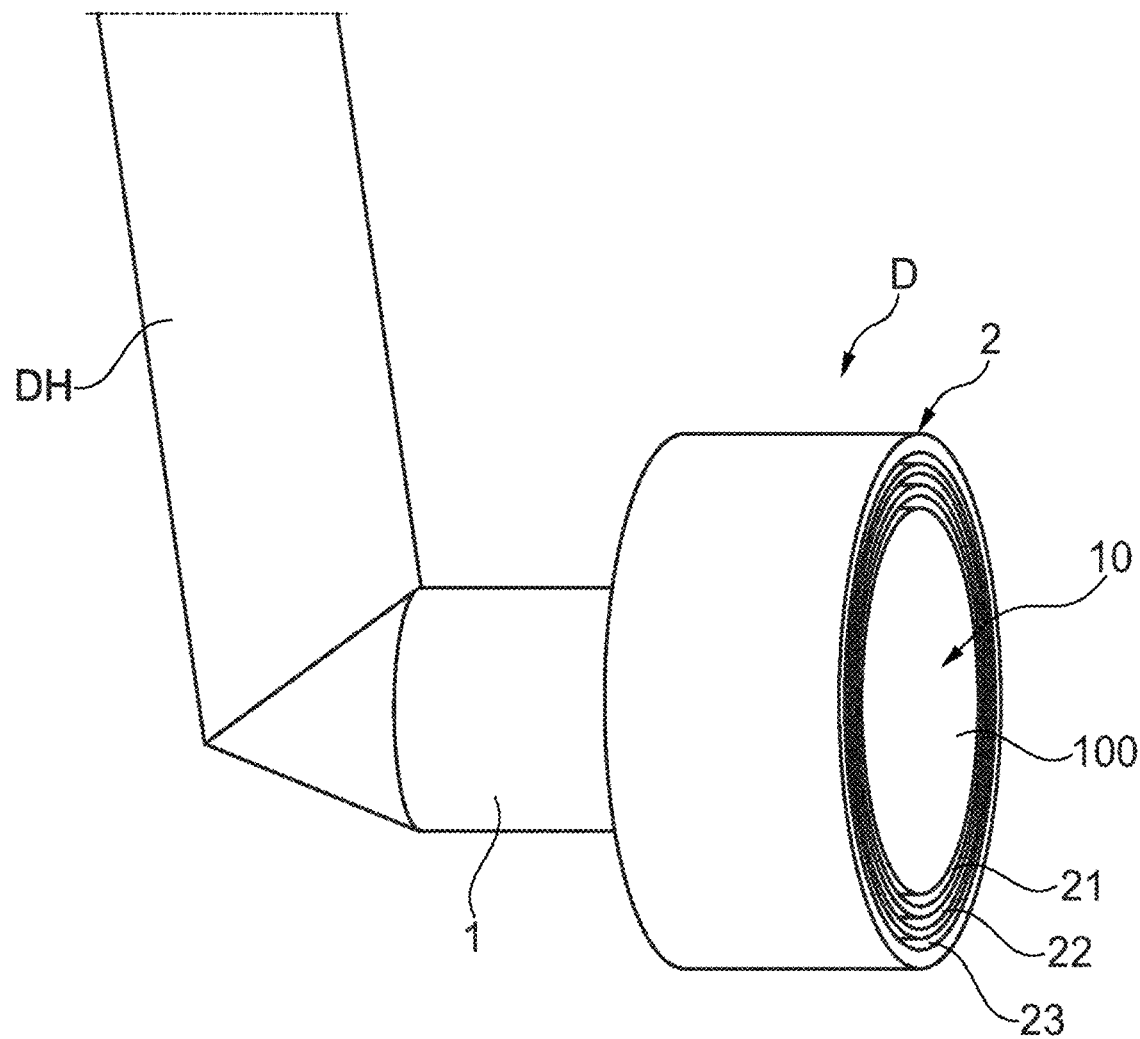
FIG. 2A shows, in a perspective view and in the form of a detail, a nozzle of a further design variant of a proposed nozzle assembly.
Figure 2B:
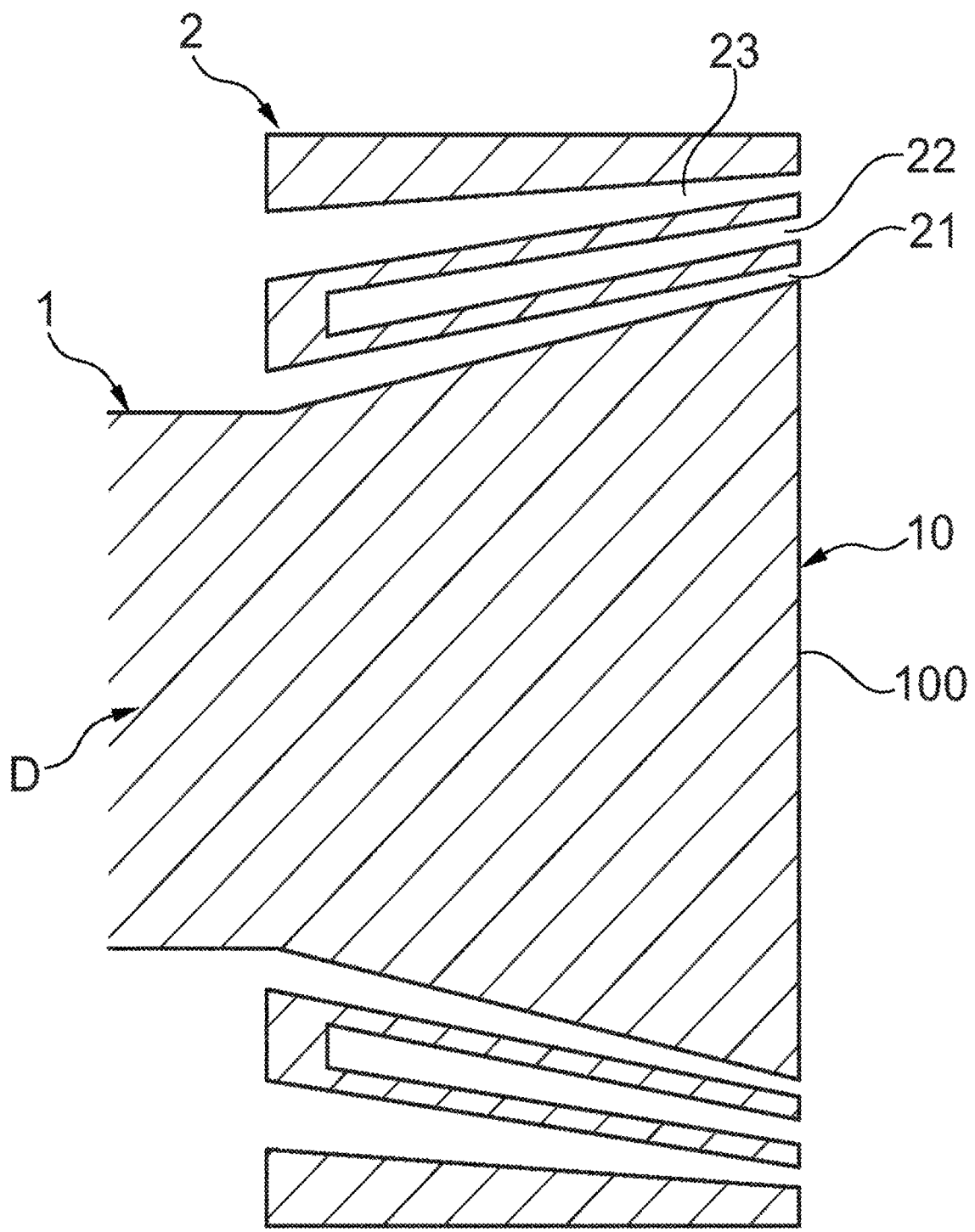
FIG. 2B shows a sectional view of the nozzle of FIG. 2A.

The design variant of FIGS. 2A and 2B corresponds in some structural details to the design variants of FIGS. 1A to 1C, in particular in respect of the design of the stabilization body 10 with its substantially flat end face 100 and its impact cooling via hydrogen which is fed in centrally and is then guided radially outward to the fuel duct 22. However, in the design variant of FIGS. 2A and 2B, the air-guiding ducts 21 and 23 and the fuel duct 22 are designed running radially to the outside at a smaller angle. In addition, only one single duct portion tapering toward the nozzle end is provided in the case of the first and second air-guiding ducts 21 and 23.

In contrast to the design variants of FIGS. 1A-1C and 2A-2B, in the design variant of FIGS. 3A and 3B, no central fuel feed line 11 for supplying the hydrogen to the nozzle head 2 is provided. Instead, a first air-guiding duct 12 is formed centrally here. The hydrogen is supplied to the fuel duct 22, which is still annular in cross section, in a portion of the nozzle main body 1 which is situated radially further to the outside.

In contrast to the design variants of FIGS. 1A-1C and 2A-2B, an air flow is also not guided unswirled to the combustion space 1030 via the first air-guiding duct 12 of the design variant of FIGS. 3A-3B. On the contrary, the first air-guiding duct 12 has a swirler 120 upstream of the nozzle end in order to impart swirl to inflowing air.

At the end of the central first air-guiding duct 12 of FIGS. 3A-3B, the air flows in swirling form into the combustion space 1030. In addition, the first air-guiding duct 12 widens radially outward at its duct end. A flow-guiding element 121 of the central air-guiding duct 12, which flow-guiding element appears to be funnel-shaped, as seen in top view from the combustion space 1030, runs at an (opening) angle to the nozzle longitudinal axis L, which lies in the range of the angle α at which the fuel duct 22 and the radially outermost second air-guiding duct 23 run radially to the outside toward their respective duct end. The combination of swirled air flow from a central first air-guiding duct 12 in combination with hydrogen injected unswirled radially to the outside and a second air flow flowing unswirled radially to the outside from the second air-guiding duct 23 has likewise proven advantageous for operation of the engine T with hydrogen, although the air flow from the central air-guiding duct 12 is injected into the combustion space 1030 at a lower axial flow velocity than the air from a first air-guiding duct 21 of FIGS. 1A-1C and 2A-2B. A recirculation zone is also formed in the structure of FIGS. 3A-3B, in a central region downstream of the nozzle D and in particular of the nozzle head 2. The swirl here additionally ensures that the flow opens to the outside.

In the design variants of FIGS. 4A-4B and 5A-5B, analogously to the design variant of FIGS. 3A and 3B, a central first air-guiding duct 12 for an air flow into the combustion space 1030 is likewise provided at the nozzle D. However, in the design variants of FIGS. 4A-4B and 5A-5B, the air from the central first air-guiding duct 12 is also introduced unswirled into the combustion space 1030.

In each of the design variants of FIGS. 4A-4B and 5A-5B, a flow divider 122 is provided within the first air-guiding duct 12 toward the end of the nozzle D. Via said flow divider 122, an air flow within the first air-guiding duct is divided into two partial air flows, an inner partial air flow and an outer partial air flow. For this purpose, the flow divider 122 has a pipe portion 122a with a cross-sectional area which remains the same and through which the flow passes, and a diffuser part 122b adjoining the pipe portion downstream thereof. The diffuser part 122b widens toward the nozzle end, and therefore the cross-sectional area thereof increases continuously along the nozzle longitudinal axis L. An inner air-guiding duct part 12.2 is defined within the pipe portion 122a and the diffuser part 122b. An outer air-guiding duct part 12.1 is defined between a radially outer lateral surface of the flow divider 122 and an inner lateral surface of a duct wall of the first air-guiding duct 12. Toward the nozzle end, the portion of the outer air-guiding duct part 12.1 is then consequently bordered (radially on the outside) by the flow-guiding element 121 and (radially on the inside) by the widening diffuser part 122b. In such a way, the outer air-guiding duct part 12.1 faces radially outward and defines an annular gap at the nozzle end for the partial air flow to be introduced by it. The duct height of said annular gap is substantially of the order of magnitude of the fuel outlet opening of the fuel duct 22 and the (second) air outlet opening of the radially outermost air-guiding duct 23.

Furthermore, from the sectional illustrations of FIGS. 4B and 5B, not only is in each case a strut 220, which extends radially outward within the respective fuel duct 22, apparent, but especially so too is the geometry of the respective flow divider 122. In addition, an elongate central flow body 123 which is located centrally in the form of a pin within the pipe portion 122a is apparent therefrom. The flow can flow axially around said flow body 123 within the respective pipe portion 122a, and there is therefore in each case a cross-sectional area which is merely annular in cross section and through which the flow passes within the pipe portion 122a. This contributes to the homogenization of the unswirled inner partial air flow from the inner air-guiding duct part 12.2, via which the resulting fuel-air mixture in the vicinity of the nozzle D is intended to be leaned. Consequently, additional air is introduced here centrally along the nozzle longitudinal axis L in order to avoid combustion directly downstream of the nozzle end and thus undesired heating of the nozzle D.

The design variants of FIGS. 4A-4B and 5A-5B differ above all in the configuration of the nozzle end and in the configuration of the flow divider 122 within the central first air-guiding duct 12.

In the design variant of FIGS. 4A and 4B, the outlet openings of the air-guiding ducts 12 and 23 and of the fuel duct 22 are not offset axially with respect to one another and therefore lie in a radial plane running perpendicularly to the nozzle longitudinal axis L, as is also the case in the design variants of FIGS. 1A to 3B. Accordingly, the diffuser part 122b of the flow divider 22 also extends axially as far as said radial plane.

In the design variant of FIGS. 5A and 5B, by contrast, an axial offset between the outlet openings is provided. The further radially to the inside the respective outlet opening lies, the greater is the offset in relation to the radially outermost and thus furthest axially protruding outlet opening of the second air-guiding duct 23 and thus the further it lies upstream. For example, that part of the air outlet opening of the first air-guiding duct 12 which is defined by the inner air-guiding duct part 12.2 lies axially furthest upstream. In comparison to the design variant of FIGS. 4A and 4B, in the design variant of FIGS. 5A and 5B, the diffuser part 122b therefore has a shorter axial length. Therefore, although the cross-sectional area, through which the flow passes, of that part of the air outlet opening of the first air-guiding duct 12 which is defined by the inner air-guiding duct part 12.2 continues to be larger by a factor of at least 8 than the cross-sectional area of that part of the air outlet opening which is defined by the outer air-guiding duct part 12.1, it is significantly smaller than in the case of the design variant of FIGS. 4A and 4B. The positioning of the outlet openings and in particular the possible axial offset thereof can vary depending on a use scenario and therefore on an engine T and/or, for example, depending on a desired flow profile of the fuel-air mixture into the combustion space 1030.

The nozzle D of the design variants of FIGS. 1A-1C, 2A-2B, 3A-3B, 4A-4B and 5A-5B is furthermore in each case designed and provided for rich quench lean combustion. In principle, the nozzle D which is illustrated may also be used for lean combustion concepts.

It is self-evident that the proposed solution is not limited to the exemplary embodiments described above, and various modifications and improvements can be made without departing from the concepts described here. Any of the features may be used separately or in combination with any other features, unless they are mutually exclusive, and the disclosure extends to and includes all combinations and sub-combinations of one or more features which are described here.

LIST OF DESIGNATIONS

1 Nozzle main body
10 Stabilization body
100 End face
101 Rear wall
102 Cavity
103 Combustion chamber
1030 Combustion space
10A, 10B Inner wall portion
11 Central fuel feed line
110 End piece
12 (Central) first air-guiding duct
12.1, 12.2 Outer/inner air-guiding duct part
120 Swirler
121 Flow-guiding element
122 Flow divider
122a Pipe portion
122b Diffuser part
123 Flow body
2 Nozzle head
21 First air-guiding duct
21A, 21B Duct section
22 Hydrogen duct
22A, 22B Duct portion
220 Strut
23 Second air-guiding duct
24 Strut
24.1, 24.2 Strut part
111 Low-pressure compressor 112 High-pressure compressor
113 High-pressure turbine
114 Medium-pressure turbine
115 Low-pressure turbine
A Outlet
a11, a12, a21, a22 Duct height
B Bypass duct
BK Combustion chamber assembly
BR Combustor seal
C Outlet cone
D Diameter
D Nozzle
DH Nozzle bracket
E Inlet/intake
F Fan
F1, F2 Fluid flow
FC Fan casing
G Outer housing
L Nozzle longitudinal axis
M Centre axis/axis of rotation
R Combustion chamber ring
S Rotor shaft
T (Turbofan) engine
TT Turbine
V Compressor
α Angle

The invention claimed is:

1. A nozzle assembly for a combustion chamber of an engine, comprising:
   at least one nozzle for injecting hydrogen into a combustion space of the combustion chamber, wherein the at least one nozzle includes a nozzle main body which extends along a nozzle longitudinal axis and a nozzle head at one end of the nozzle main body, the at least one nozzle further including:
      at least one first air-guiding duct to guide a first air flow in a direction of the combustion space and to conduct the first air flow via at least one first air outlet opening of the at least one first air-guiding duct into the combustion space,
      at least one fuel duct on the nozzle head to guide the hydrogen in the direction of the combustion space, and
      at least one second air-guiding duct to guide a second air flow in the direction of the combustion space and to conduct the second air flow via at least one second air outlet opening of the second air-guiding duct into the combustion space,
   wherein the at least one fuel duct includes a fuel outlet opening for the hydrogen to be injected into the combustion space, the at least one fuel duct being is arranged between the first and second air-guiding ducts with their first and second air outlet openings, with respect to a radial direction running perpendicularly to the nozzle longitudinal axis,
   wherein the at least one second air-guiding duct is situated radially to an outside of the at least one fuel duct and is configured for supplying an unswirled air flow to the combustion space and wherein the at least one fuel duct is configured for supplying an unswirled flow of the hydrogen into the combustion space,
   a central fuel feed line in the nozzle main body for feeding the hydrogen to the at least one fuel duct;
   at least one fluid guide positioned on the nozzle head, via which the hydrogen is guided from the central fuel feed line into the at least one fuel duct which is situated radially further to the outside.

2. The nozzle assembly as claimed in claim 1, wherein the at least one second air-guiding duct and the at least one fuel duct run radially outwardly at respective duct ends thereof.

3. The nozzle assembly as claimed in claim 2, wherein the at least one second air-guiding duct which is situated radially further to the outside comprises a duct portion which includes the second air outlet opening and runs at an angle in the range of 30° to 60° with respect to the nozzle longitudinal axis, and/or the at least one fuel duct includes a duct portion which includes the fuel outlet opening and runs at an angle in the range of 30° to 60° with respect to the nozzle longitudinal axis.

4. The nozzle assembly as claimed in claim 1, wherein the at least one fuel duct and/or the at least one second air-guiding duct taper toward respective duct ends thereof.

5. The nozzle assembly as claimed in claim 1, wherein at least a part of the at least one fluid guide is provided within a radially outwardly extending strut of the nozzle head, which strut runs through a portion of the at least one first air-guiding duct.

6. The nozzle assembly as claimed in claim 1, and further comprising a stabilization body positioned centrally at one end of the at least one nozzle, said stabilization body comprising a substantially flat end face facing the combustion space.

7. The nozzle assembly as claimed in claim 6, wherein the stabilization body by way of an outer lateral surface defines at least a part of an inner wall of the at least one first air-guiding duct which is situated radially on the inside.

8. The nozzle assembly as claimed in claim 7, wherein the stabilization body by way of an outer lateral surface thereof defines a radially outwardly facing inner wall portion for the at least one first air-guiding duct such that the at least one first air-guiding duct runs radially to the outside at a duct end thereof.

9. The nozzle assembly as claimed in claim 7, wherein the at least one first air-guiding duct which is situated radially on the inside tapers toward a duct end.

10. The nozzle assembly as claimed in claim 6, wherein the substantially flat end face of the stabilization body facing the combustion space includes an extent in a radial direction, with respect to the nozzle longitudinal axis, that corresponds to at least twenty times, a duct height of the at least one first air-guiding duct at the at least one first air outlet opening and/or a duct height of the at least one second air-guiding duct at the second air outlet opening and/or a duct height of the at least one fuel duct at the fuel outlet opening.

11. The nozzle assembly as claimed in claim 6, wherein cooling is provided for the stabilization body.

12. The nozzle assembly as claimed in claim 1, and further comprising a stabilization body positioned centrally at one end of the at least one nozzle, said stabilization body comprising a substantially flat end face facing the combustion space; wherein at least a part of the at least one fluid guide is provided within the stabilization body.

13. The nozzle assembly as claimed in claim 12, wherein the at least part of the at least one fluid guide which is provided within the stabilization body also provides cooling to the stabilization body.

14. The nozzle assembly as claimed in claim 13, wherein, for impact cooling of the stabilization body with hydrogen, hydrogen is guided via the at least part of the at least one fluid guide which is provided within the stabilization body against a rear wall of the stabilization body that faces away from the combustion space.

15. The nozzle assembly as claimed in claim 1, wherein the at least one first air-guiding duct is provided centrally on the nozzle main body running along the nozzle longitudinal axis and a fuel feed line for the at least one fuel duct is provided in the nozzle main body in a portion of the nozzle main body which is situated radially to an outside of the at least one first air-guiding duct.

16. The nozzle assembly as claimed in claim 15, wherein the at least one first air-guiding duct widens at an end having the at least one first air outlet opening and thus forms a flow-guiding element extending radially to the outside.

17. The nozzle assembly as claimed in claim 15, and further comprising at least one swirler for swirling the air flow supplied via the at least one first air-guiding duct to the combustion space positioned in the at least one first air-guiding duct.

18. The nozzle assembly as claimed in claim 15, and further comprising a centrally arranged flow divider positioned in the at least one first air-guiding duct, via which the first air flow in the at least one first air-guiding duct is divided between an inner and outer air-guiding duct part at an end of the at least one nozzle.

19. The nozzle assembly as claimed in claim 18, wherein the flow divider includes a pipe portion with a cross-sectional area remaining constant along the nozzle longitudinal axis and a diffuser part which adjoins the pipe portion toward the nozzle end and has a cross-sectional area increasing along the nozzle longitudinal axis.

20. The nozzle assembly as claimed in claim 19, wherein the at least one first air-guiding duct widens at an end having the at least one first air outlet opening and thus forms a flow-guiding element extending radially to the outside, wherein the flow-guiding element and the diffuser part border the outer air-guiding duct part which faces radially to the outside.

21. The nozzle assembly as claimed in claim 19, and further comprising a flow body, around which the flow will flow axially, positioned centrally in the pipe portion.

22. The nozzle assembly as claimed in claim 18, wherein, at the nozzle end, that part of the at least one first air outlet opening which is defined by the inner air-guiding duct part has a cross-sectional area which is larger by at least a factor of 8, than the cross-sectional area of that part of the at least one first air outlet opening which is defined by the outer air-guiding duct part.

23. The nozzle assembly as claimed in claim 1, wherein the at least one first air outlet opening, the at least one second air outlet opening and the fuel outlet opening lie in a radial plane running perpendicularly to the nozzle longitudinal axis or are offset axially with respect to one another.

24. An engine having at least one of the nozzle assembly as claimed in claim 1.

25. A nozzle assembly for a combustion chamber of an engine, comprising:
at least one nozzle for injecting hydrogen into a combustion space of the combustion chamber, wherein the at least one nozzle includes a nozzle main body which extends along a nozzle longitudinal axis and a nozzle head at one end of the nozzle main body, the at least one nozzle further including:
at least one first air-guiding duct to guide a first air flow in a direction of the combustion space and to conduct the first air flow via at least one first air outlet opening of the at least one first air-guiding duct into the combustion space,
at least one fuel duct on the nozzle head to guide the hydrogen in the direction of the combustion space, and
at least one second air-guiding duct to guide a second air flow in the direction of the combustion space and to conduct the second air flow via at least one second air outlet opening of the second air-guiding duct into the combustion space,
wherein the at least one fuel duct includes a fuel outlet opening for the hydrogen to be injected into the combustion space, the at least one fuel duct being arranged between the first and second air-guiding ducts with their first and second air outlet openings, with respect to a radial direction running perpendicularly to the nozzle longitudinal axis,
wherein the at least one second air-guiding duct is situated radially to an outside of the at least one fuel duct and is configured for supplying an unswirled air flow to the combustion space and wherein the at least one fuel duct is configured for supplying an unswirled flow of the hydrogen into the combustion space,
a stabilization body positioned centrally at one end of the at least one nozzle, said stabilization body comprising a substantially flat end face facing the combustion space,
wherein the substantially flat end face of the stabilization body facing the combustion space includes an extent in a radial direction, with respect to the nozzle longitudinal axis, that corresponds to at least twenty times, a duct height of the at least one first air-guiding duct at the at least one first air outlet opening and/or a duct height of the at least one second air-guiding duct at the second air outlet opening and/or a duct height of the at least one fuel duct at the fuel outlet opening.

26. A nozzle assembly for a combustion chamber of an engine, comprising:
at least one nozzle for injecting hydrogen into a combustion space of the combustion chamber, wherein the at least one nozzle includes a nozzle main body which extends along a nozzle longitudinal axis and a nozzle head at one end of the nozzle main body, the at least one nozzle further including:
at least one first air-guiding duct to guide a first air flow in a direction of the combustion space and to conduct the first air flow via at least one first air outlet opening of the at least one first air-guiding duct into the combustion space,
at least one fuel duct on the nozzle head to guide the hydrogen in the direction of the combustion space, and
at least one second air-guiding duct to guide a second air flow in the direction of the combustion space and to conduct the second air flow via at least one second air outlet opening of the second air-guiding duct into the combustion space,
wherein the at least one fuel duct includes a fuel outlet opening for the hydrogen to be injected into the combustion space, the at least one fuel duct being arranged between the first and second air-guiding ducts with their first and second air outlet openings, with respect to a radial direction running perpendicularly to the nozzle longitudinal axis,
wherein the at least one second air-guiding duct is situated radially to an outside of the at least one fuel duct and is configured for supplying an unswirled air flow to the combustion space and wherein the at least one fuel duct is configured for supplying an unswirled flow of the hydrogen into the combustion space,
wherein the at least one first air-guiding duct is provided centrally on the nozzle main body running along the nozzle longitudinal axis and a fuel feed line for the at least one fuel duct is provided in the nozzle main body in a portion of the nozzle main body which is situated radially to an outside of the at least one first air-guiding duct, a centrally arranged flow divider positioned in the at least one first air-guiding duct, via which the first air flow in the at least one first air-guiding duct is divided between an inner and outer air-guiding duct part at an end of the at least one nozzle, wherein the flow divider includes a pipe portion with a cross-sectional area remaining constant along the nozzle longitudinal axis and a diffuser part which adjoins the pipe portion toward the nozzle end and has a cross-sectional area increasing along the nozzle longitudinal axis.

* * * * *